March 30, 1926. 1,579,105
J. A. GREEN
FISH ELEVATOR
Filed August 31, 1925 4 Sheets-Sheet 1

James A. Green INVENTOR

March 30, 1926.

J. A. GREEN 1,579,105

FISH ELEVATOR

Filed August 31, 1925    4 Sheets-Sheet 2

James A. Green
INVENTOR

BY Victor J. Evans
ATTORNEY

WITNESS: Gerald Hennesy Sr.

March 30, 1926.
J. A. GREEN
FISH ELEVATOR
Filed August 31, 1925
1,579,105
4 Sheets-Sheet 3
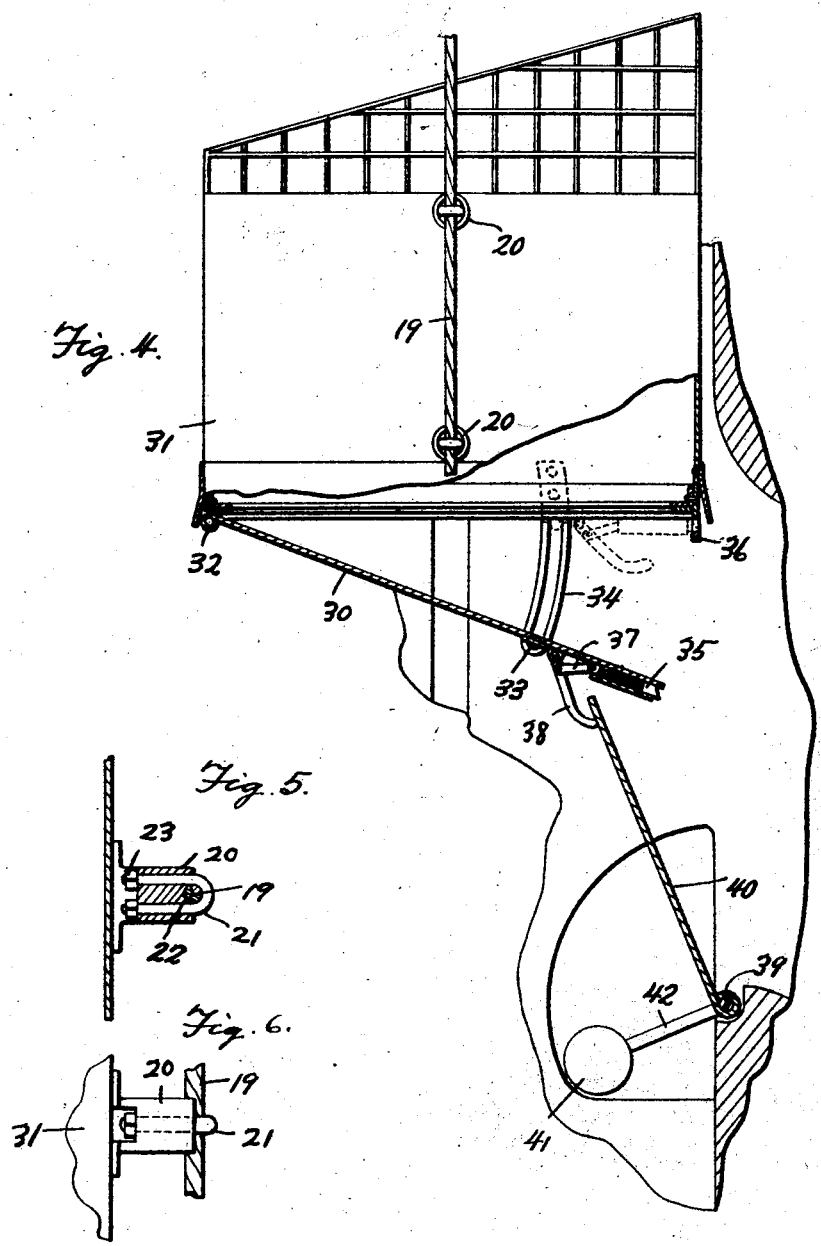

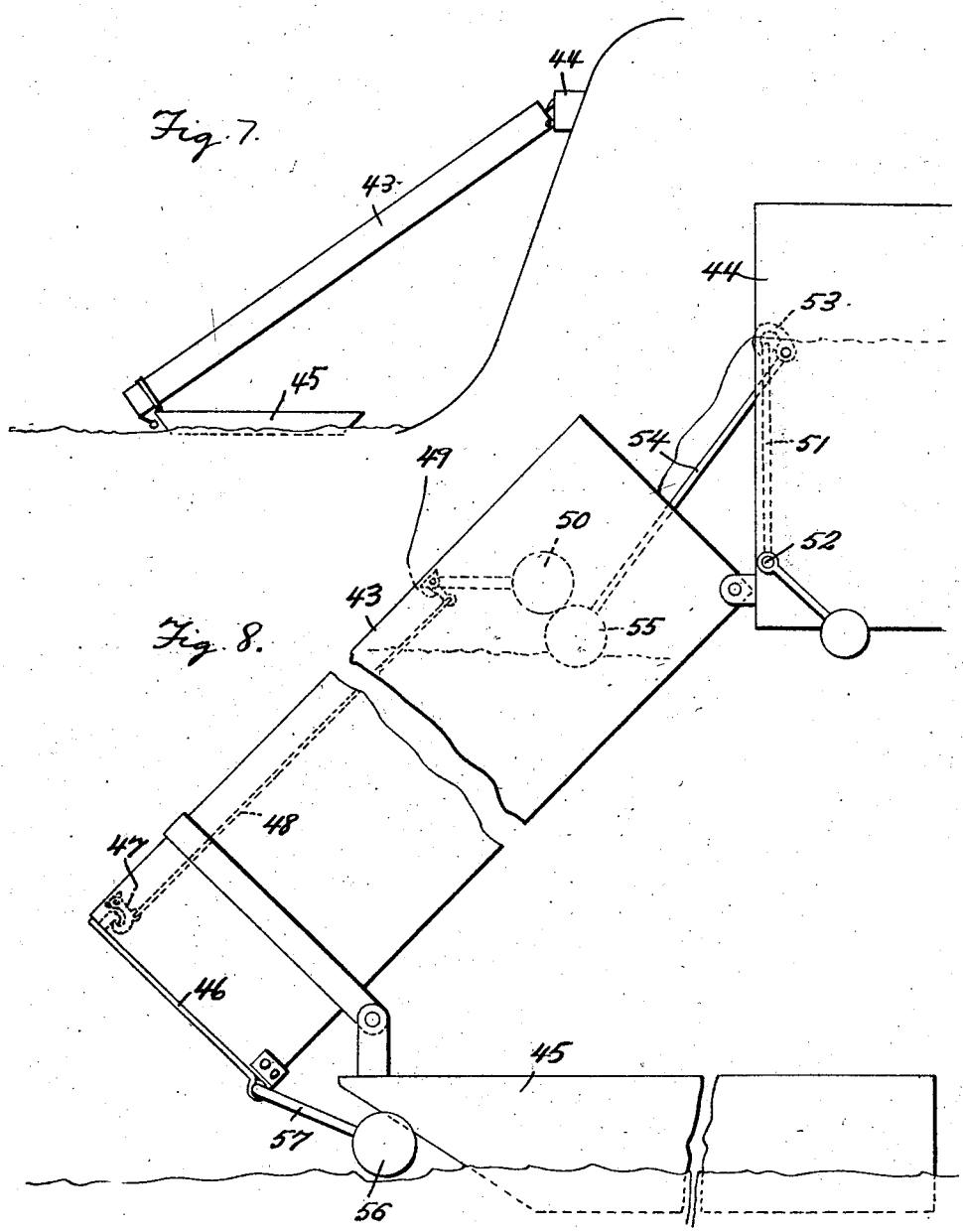

Patented Mar. 30, 1926.

1,579,105

UNITED STATES PATENT OFFICE.

JAMES A. GREEN, OF VANCOUVER, WASHINGTON.

FISH ELEVATOR.

Application filed August 31, 1925. Serial No. 53,616.

*To all whom it may concern:*

Be it known that I, JAMES A. GREEN, a citizen of the United States, residing at Vancouver, in the county of Clarke and State of Washington, have invented new and useful Improvements in Fish Elevators, of which the following is a specification.

This invention contemplates the provision of an automatic fish elevator primarily designed and intended for use in carrying fish through a dam like structure from the low level of water at one side of the dam to the high water level at the other side of the dam, and resides in the novel construction, combination and arrangement of parts as claimed.

In the drawings forming part of this application, like numerals of reference indicate similar parts in the several views, and wherein:

Figure 4 is an enlarged view partly in section showing how the bottom of each elevated bucket is automatically opened as it nears the top of the dam.

Figure 5 is a sectional view showing the connection between each bracket and the elevator cable.

Figure 6 is a detail view of the clamp therefor.

Figure 7 is a diagrammatic view showing the use of a conduit for returning the fish to the stream where the latter is of a receding nature.

Figure 8 is an enlarged view of the structure shown in Figure 7.

Figure 1:
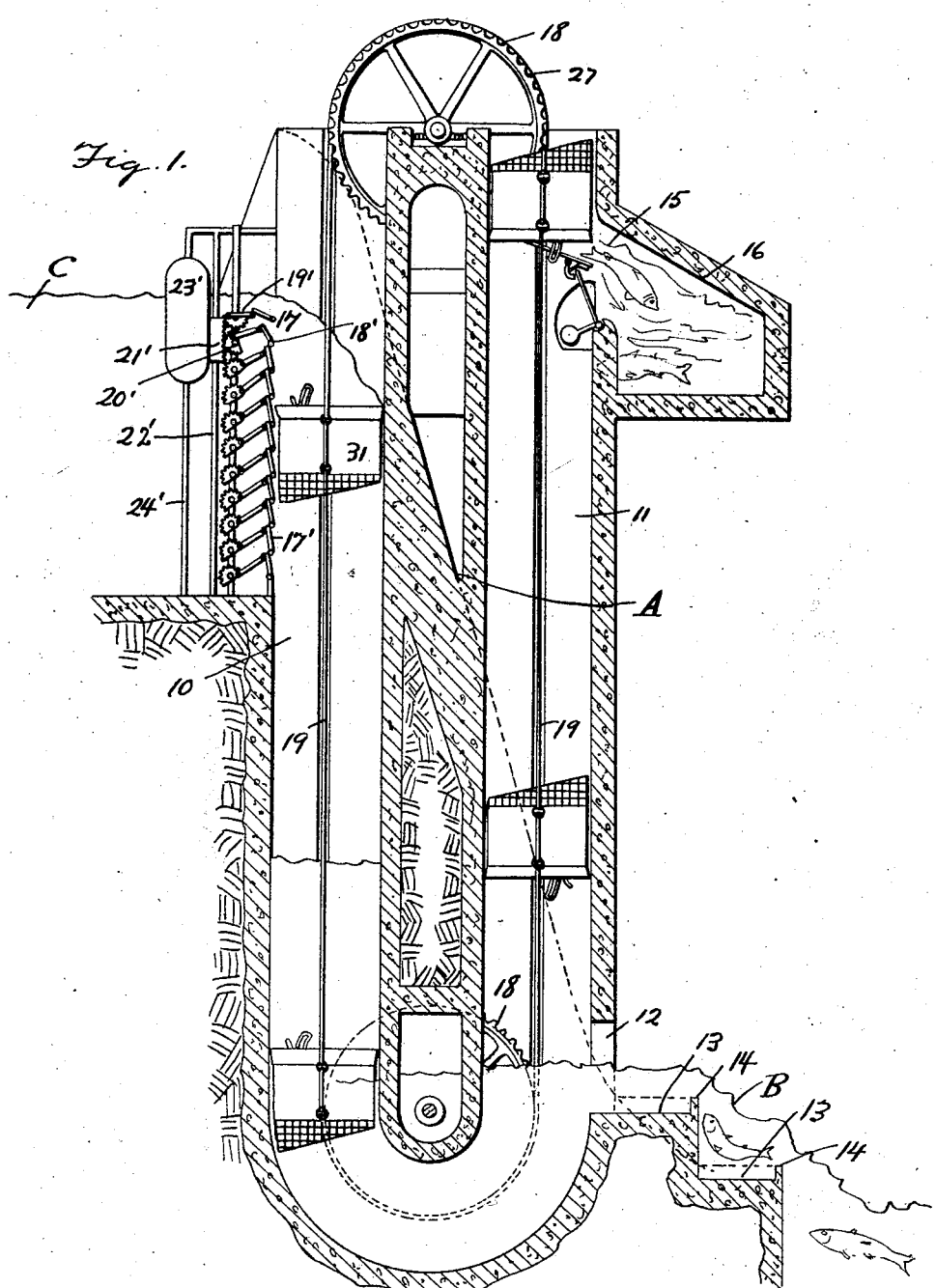
Figure 1 is a view showing a section through the dam like structure and the arrangement of the elevator buckets for the purpose above mentioned.

Referring to the drawings in detail, A indicates generally a dam like structure, B the low level side of a stream and C the high level side thereof, the dam like structure being designed to accommodate what I term an automatically operated elevator for lifting the fish from the low level side of the stream to a position whereby they can pass to the high level side thereof. For this purpose, the dam like structure is formed with spaced vertically disposed passages 10 and 11 respectively through which the buckets forming part of the elevator are adapted to travel. One side of this dam at a point adjacent the lower end thereof is formed with an opening 12 to receive the water and fish from the low level side of the stream, thereby allowing the fish to enter the dam for the purpose above described. The dam at this side and adjacent the lower end thereof is also formed with steps 13 to entice and assist the fish to enter the opening 12. Each of these steps is formed with an upstanding ledge 14 as clearly shown in Figure 1. At a point adjacent the upper end of the dam and at the same side thereof is an opening 15 which establishes communication between the passage 11 of the dam and the tunnel like structure 16 which extends around the dam and communicates with the high level side of the stream. The other side of the dam is provided with a water inlet 17 which receives the water from the high level side of the stream for a purpose to be presently described.

The admittance of water through the opening 17 is controlled by a series of vertically disposed valves 17', each of which is capable of independent operation. The valves are pivoted at their lower ends as at 18', and connected adjacent the upper ends with links 19', each link being associated with a toothed segment 20'. All of the segments of the respective valves are disposed in the path of movement of a rack bar 21', the latter being capable of sliding movement upon a suitable support or guide 22', and controlled in its movements by a float 23' which also operates on a suitable guide 24'. In other words, as the float 23' falls with the falling of the level of the water on the high side of the dam, the rack bar 21 successfully engages the segments 20', thereby opening the valves 17' to allow water to enter the structure, thus insuring a proper amount of water entering the structure to operate the buckets as will be hereinafter described.

Figure 2:
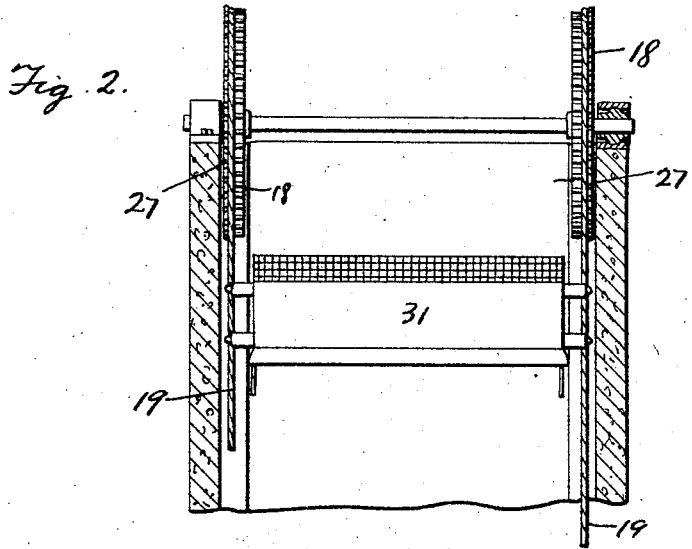
Figure 2 is a fragmentary sectional view through the dam like structure showing how the elevator is mounted therein.
Figure 3:
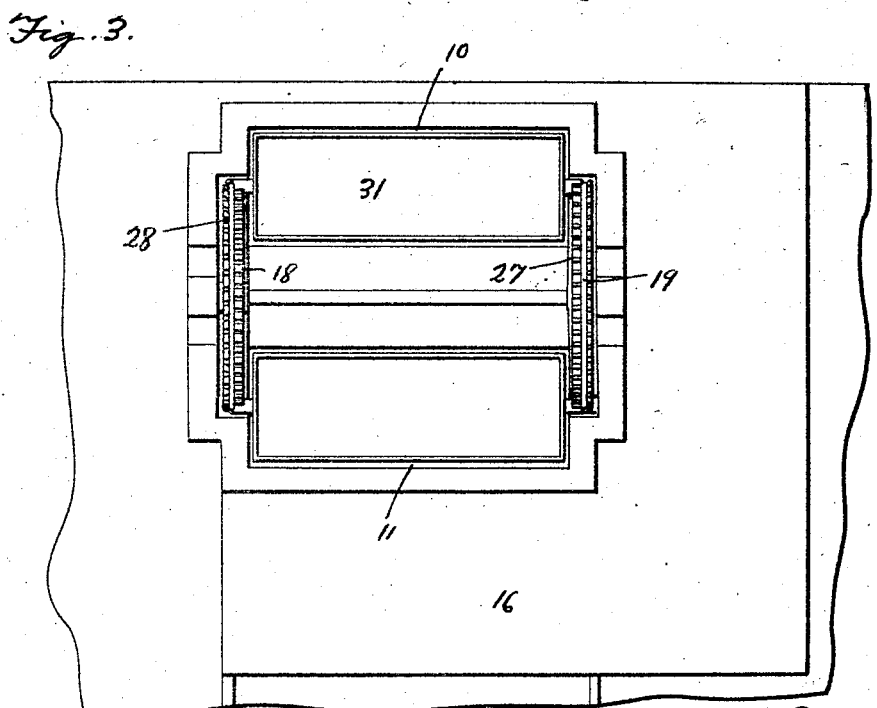
Figure 3 is a view taken at a right angle to Figure 2.

Journalled at the top and bottom of the dam like structure are spaced pairs of grooved wheels 18 over which are trained spaced endless cables 19, these cables supporting the elevator buckets shown in Figure 1. Each bucket is mounted between the cables 19, as shown in Figures 2, 5 and 6. In other words, each bucket supports at spaced points upper and lower bosses 20 which are provided with spaced bores to receive a substantially U-shaped bolt 21 for the purpose of attaching the bucket to the cable 10. As shown in Figure 5, the boss 20 is formed with a depression 22 in which the cable 19 is clamped by the bolt 21 when the latter is secured to said boss by the nuts 23. This construction allows the buckets to be easily and conveniently attached to or removed from the cables as the occasion may require.

Each of the elevator buckets is preferably of the construction shown in Figure 4, which shows the inverted position of the bucket, the bucket being open at its bottom, and closed at the top by means of a hinged cover 30. Each cover is hinged to the body 31 of the bucket as at 32, and projecting from each cover is a pin 33 which operates in a slotted guide 34 projecting from the adjacent end of the bucket as clearly shown in Figure 4. The normal position of the bucket is clearly illustrated at the left hand side of Figure 1, while the inverted position of the bucket is shown in Figure 4. The cover 30 for each bucket includes a spring pressed sliding latch 35 which is normally received by a keeper 36, the latch being connected to a short lever 37 pivoted upon the cover, by means of a link 38. The purpose of this construction will be hereinafter described, it being utilized to automatically unlatch the cover 30, and allow the latter to gravitate to an opened position to release the fish at the proper time.

With the dam like structure arranged in the manner shown in Figure 1, each bucket 31 as it passes the opening 17 is subjected to the weight of the water flowing into the structure through said opening, the bucket being in its upright position and the cover closed. The weight of the water is utilized to operate the elevator, and as each bucket descends through the passage 10, it receives the fish which have previously entered the dam like structure through the opening 12. Now, as each bucket passes beneath the lowermost wheels 18 of the elevator structure, the bucket is of course inverted, the top or cover 30 now forming the bottom to return the fish therein, the cover being held in its closed position by the spring pressed latch 35. The bucket moves upwardly in the passage 11, and as it nears the top of the dam like structure, the cover 30 is automatically unlatched to allow the cover to gravitate to an opened position, as the bucket passes the opening 15, thereby allowing the fish to pass from each bucket into the tunnel like structure 16. The fish travel around this tunnel like structure into the stream at the high level side indicated at C in Figure 1.

The means for automatically unlatching the cover 30 preferably consists of a shaft 39 mounted upon the dam like structure for rotation immediately beneath the opening 15. Supported by this shaft is an apron 40 which normally assumes the position shown in Figure 4, being influenced by the weight 41 carried by the end of an arm 42 projecting inwardly from the shaft 39. Now, as each bucket moves upwardly in the passage 11, it strikes the weight 41 turning the shaft 39 to move the apron parallel with the adjacent side of the dam like structure, until the bucket passes beyond the upper end of the apron 40. Then the apron gravitates to the position shown in Figure 4, under the influence of the weight 41, and in doing so strikes the lever 37 carried by the cover 30, rocking this lever 37 upon its pivot in a direction to exert a pull upon the latch 35. The latch is thus retracted from the keeper 36, and the cover is allowed to gravitate to an opened position, being limited in its movement in this direction by means of the pin 33 and the slotted guide 34.

If the water at the other side of the dam is of a receding nature, I make use of a conduit 43 which is arranged obliquely or at a proper inclination with respect to the adjacent end of the tunnel like structure indicated at 44 in Figure 7. This conduit 43 is supported by means of a float 45, and its lower end is normally closed by a pivoted door 46, which is held closed by means of a pivoted latch 47 connected with one end of a rod 48 arranged within the conduit 43, and which rod has its other end connected with a float actuated lever 49, the float being indicated at 50. The adjacent end of the tunnel like structure is also closed by a door 51 which is hinged as at 52 and held closed by means of a pivoted latch 53 which is connected with one end of a float operated rod 54, the float of which is indicated at 55 and arranged within the conduit 43. Now, when the water enters the conduit 43 from the tunnel like structure 44, the water flowing over the top of the door 51, the conduit 43 starts to fill. When the level in this conduit reaches the float 55 it releases the latch 53 from the door 51, allowing the door 51 to fall partly into the conduit 43, and thus provides a slide or platform across which the fish move in entering the conduit 43. When the float 50 is raised by the level of the water, it releases the latch 47 from the door 46 at the lower end of the conduit, and the weight of the water in said conduit forces the door 46 open allowing the water and the fish to pass therefrom into the stream. After the conduit 43 has been emptied, the weight 56 carried by the end of the rod 57 attached to the door 46, automatically moves the latter to its closed position.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. In combination, a hollow dam like structure having upper and lower openings on the low level side of the stream, an endless elevator operating within said structure and including spaced buckets, each bucket having a pivoted cover and open at its bottom to receive the fish entering said structure through the lowermost opening, and as the bucket passes around the lower end of said structure, means for opening the cover of each bucket as its approaches the uppermost opening, to allow said fish to pass therefrom through said opening, and a tunnel adjacent the upper end of said structure whereby said fish may move about the structure to the high level side of the stream.

2. In combination, a hollow dam like structure having an upper and lower opening on the low level side of the stream, an endless elevator operating within said structure and including spaced buckets, each bucket having a pivoted cover and open at its bottom to receive the fish entering said structure through the lowermost opening, and as each bucket assumes the inverted position moving about the lower end of said structure, means for normally holding the cover latched, gravity means for automatically releasing said cover as the bucket approaches the uppermost opening whereby said cover gravitates to an open position to allow the fish to pass from the bucket through said opening, and a tunnel surrounding said structure and through which the fish pass to reach the high level side of the stream.

3. In combination, a hollow dam like structure having upper and lower openings on the low level side of the stream, and a water receiving opening on the high level side of the stream, an endless elevator operating in said structure and including spaced buckets, each bucket having a cover upon which the inflow of water from the high level side of the stream is supported, and utilized to operate said elevator, and open at its bottom to receive the fish entering the structure to the lowermost opening at the opposite side thereof, as each bucket moves around the lower end of the structure assuming the inverted position, means for normally holding the cover closed, gravity controlled means disposed in the path of movement of each bucket for automatically releasing the cover as it approaches the uppermost opening at one side of the structure, whereby said cover gravitates to an open position allowing the fish to pass from the bucket through said opening, and a tunnel communicating with said opening and through which the fish pass in reaching the high level side of the stream.

4. In combination, a hollow dam like structure having upper and lower openings on the low level side of the stream, an endless elevator operating in said structure, means for operating the elevator, said elevator including spaced buckets, each having a cover and open at its bottom to receive the fish entering the structure through the lowermost opening, and as the bucket moves around the lower end of the structure assuming an inverted position, means for normally holding the cover closed, means for automatically releasing the cover as the bucket approaches said uppermost opening, thereby allowing the cover to gravitate to an open position and the fish to pass from the bucket through said opening, a tunnel communicating with said opening and surrounding the structure, and through which the fish pass in reaching the other side of the stream, a conduit arranged obliquely to the outlet end of said tunnel to convey the fish therefrom into the stream whose level is beneath said tunnel, a door normally closing the lower end of the conduit, float operating means arranged within the conduit for holding said door closed and adapted to release said door when the conduit is partly filled with water, a float supporting the lower end of said conduit, and means for automatically returning the door to a closed position after the water and fish have passed out of the conduit.

In testimony whereof I affix my signature.

JAMES A. GREEN.